United States Patent [19]

Oh

[11] Patent Number: 5,269,159
[45] Date of Patent: Dec. 14, 1993

[54] DAMPING SYSTEM FOR A WASHING MACHINE

[75] Inventor: Sang K. Oh, Kyungki, Rep. of Korea

[73] Assignee: Samsung Electronics Co., Ltd., Suwon, Rep. of Korea

[21] Appl. No.: 819,126

[22] Filed: Jan. 10, 1992

[30] Foreign Application Priority Data

Jan. 26, 1991 [KR] Rep. of Korea ............ 91-1314

[51] Int. Cl.⁵ ............................................. D06F 37/24
[52] U.S. Cl. .................................... 68/12.06; 68/23.3;
200/61.45 R; 248/550; 248/638
[58] Field of Search ................ 248/550, 637, 638;
188/378; 200/61.45 R; 68/12.04, 12.06, 23.1, 23.3

[56] References Cited

U.S. PATENT DOCUMENTS

| | | | |
|---|---|---|---|
| 3,098,372 | 7/1963 | Bochan | 68/12.06 X |
| 3,226,959 | 1/1966 | Smith et al. | 68/12.06 |
| 3,636,734 | 1/1972 | Getz | 68/12.06 |
| 4,411,664 | 10/1983 | Rickard et al. | 68/12.06 X |
| 4,624,435 | 11/1986 | Freudenberg | 248/550 |
| 4,640,105 | 2/1987 | Kushner et al. | 68/23.3 |
| 4,742,698 | 5/1988 | Torita | 68/23.3 X |

Primary Examiner—Ramon O. Ramirez
Attorney, Agent, or Firm—Burns, Doane, Swecker & Mathis

[57] ABSTRACT

In a washing machine having a tub and a cabinet, gap sensors and electromagnets are mounted on the tub and other electromagnets are mounted on the cabinet. Thus, in order to prevent vibrations generated at the tub during the washing operation and dehydrating operation, the gap sensors sense the vibrations, and active damping devices and control signal portions generate control signals, so that when the tub and the cabinet become each closer to each other than the reference distance, the electromagnets generate repulsive forces and when the tub and the cabinet become more distant from each other than the reference distance, the electromagnets generate attractive forces, whereby vibrations generated at the tub are decreased.

5 Claims, 5 Drawing Sheets

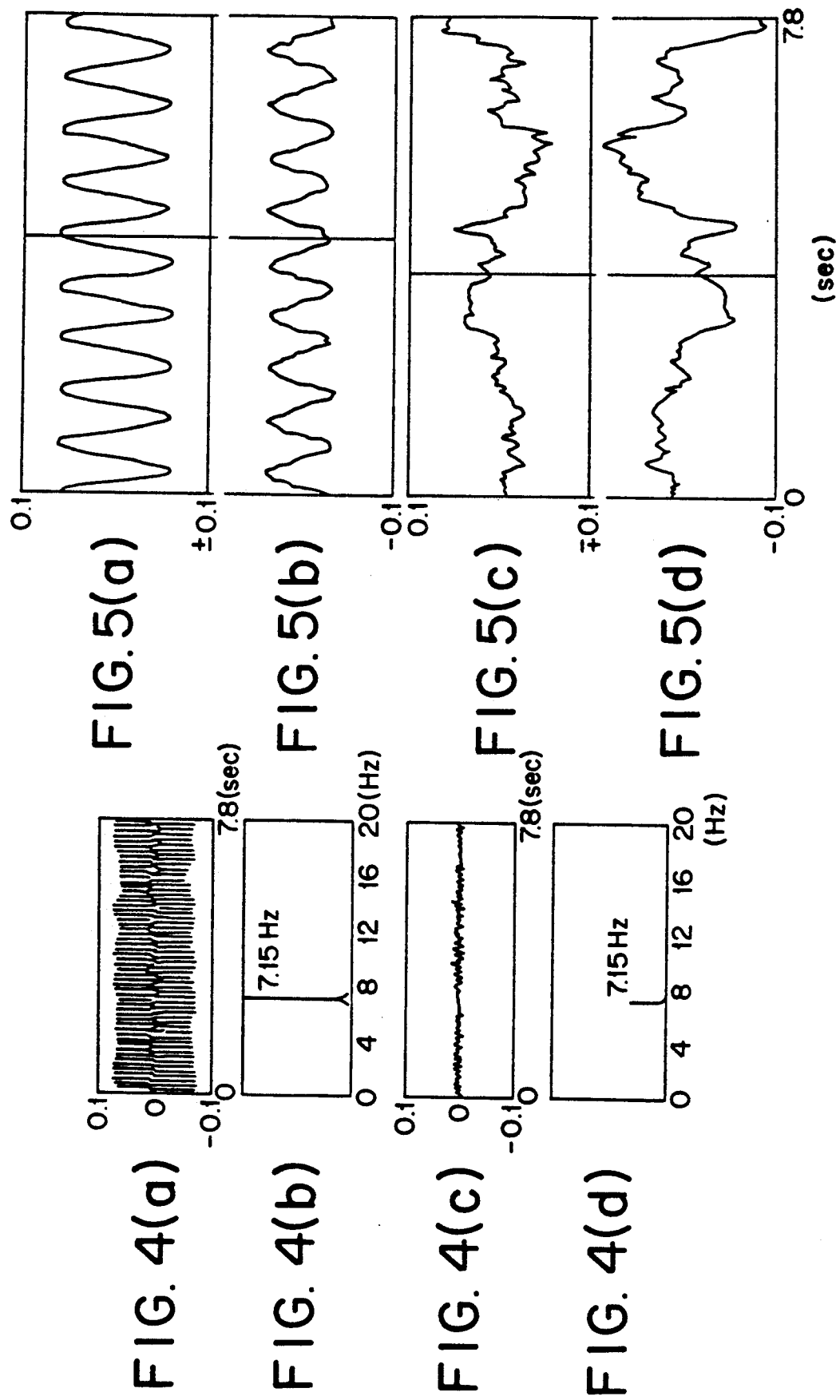

DAMPING SYSTEM FOR A WASHING MACHINE

BACKGROUND OF THE INVENTION

The present invention relates to a damping system for a washing machine, and more particularly to the system which controls the vibrations generated at a tub by rotation of a suit basket using an active damping device.

In general, an active damping system is a control system which attenuates vibration by forcing a control force against the vibration generated nonlinearly and randomly in a mechanical device, or a wing of an airplane and so on.

During the washing and dehydrating, operation of a conventional washing machine, the tub vibrates during rotation of the suit basket, and because the suit basket rotates counterclockwise during dehydrating operation, the vibration of the tub is greater during dehydrating operation. At this time, the amplitude of the vibration is dependent on the unbalance of the weight of the laundry. Accordingly, when the suit basket rotates it is slanted due to the unbalance of the weight of the laundry, and it collides with the tub. The washing machine does not perform correctly and it makes a low frequency noise due to the excessive vibration.

In order to solve the problem, such a mechanical assembly such as an elastic spring or a rubber member has been attached to the upper face of the tub in the conventional washing machine. However, the mechanical assembly has a complicated structure, and when a vibration of the suit basket is nonlinear and random, the mechanical assembly does not effectively control the vibration.

The typical example to solve the problem is disclosed in Japanese Utility Model Laid-Open Sho 54-124360. This invention does not generate an effective control force which is equal to the amplitude of the vibration and having the opposite direction. Also, because it performs a damping operation with a pair of permanent magnets, it does not generate a control force stronger than a particular force.

SUMMARY OF THE INVENTION

The present invention is devised in order to solve the above described problem.

It is an object of the present invention to provide an apparatus which controls the vibration generated in the rotation of the suit basket.

It is another object of the present invention to provide an apparatus which generates a control force equal and opposite to the vibration.

In order to achieve the objects, gap sensors are mounted at four points at an angle of 90 degrees on the cylinder surface of the tub. First control force portions are installed at the proximity of the gap sensors. Second control force portions are mounted on surfaces of the cabinet opposite to the first control force portions. An active damping portion receives a signal from the corresponding gap sensor and generates a signal equal and opposite to the signal from the gap sensor. When distance between the gap sensor and the surface of the cabinet is less than the reference distance, a control signal portion generates a signal equal to the signal from the active damping portion. When distance between the gap sensor and the surface of the cabinet is greater than the reference distance, a control signal portion generates a signal equal and opposite to the signal from the active damping portion. The signal from the active damping portion is amplified and applied to the first control force portion and the signal from the control signal portion is amplified and applied to the second control force portion. Therefore, when the distance between the gap sensor and the surface of the cabinet is greater than the reference distance, the first control force portion and the second control force portion draw each other and when the distance is greater, they push each other. Thus, the vibration generated at the tub is suppressed.

BRIEF DESCRIPTION OF THE DRAWINGS

FIGS. 4(a-d) is a waveform diagram showing the result of the performance test of control force generated in the active damping portion;

FIGS. 5(a-d) is a waveform diagram showing the result of the damping experiment of the active damping portion.

DETAILED DESCRIPTION OF THE INVENTION

Figure 1:
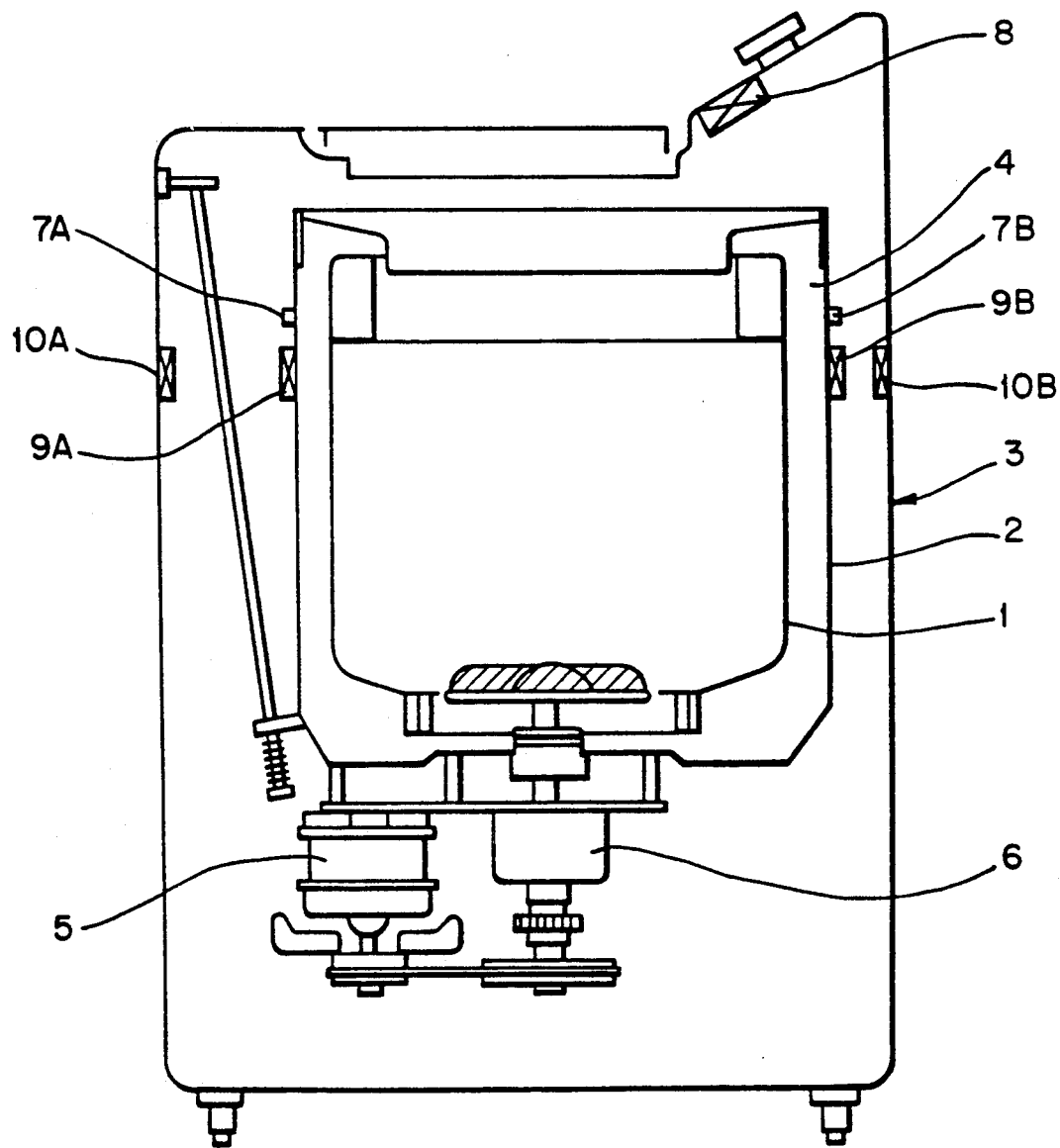
FIG. 1 is a schematical cross-section view of the washing machine including the damping system according to the present invention.

The preferred embodiment of the present invention will be described with reference to the drawings. In FIG. 1, a suit basket 1 receives the laundry and is driven by a rotation force transmitted from a motor 5, so it performs washing and dehydrating operations. A tub 2 includes the suit basket 1 and has water in it at the time of washing and dehydrating operations. A cabinet 3 is an external housing of the washing machine and protects the suit basket 1, tub 2 and motor 5 and so on. Suspension bars 4 are mounted in the four corners of the cabinet 3, and they absorb shock caused by downward and upward vibrations of the suit basket 1 and tub 2. A power transmission portion 6 transmits the rotation force of the motor 5 to the suit basket 1.

Figure 2:
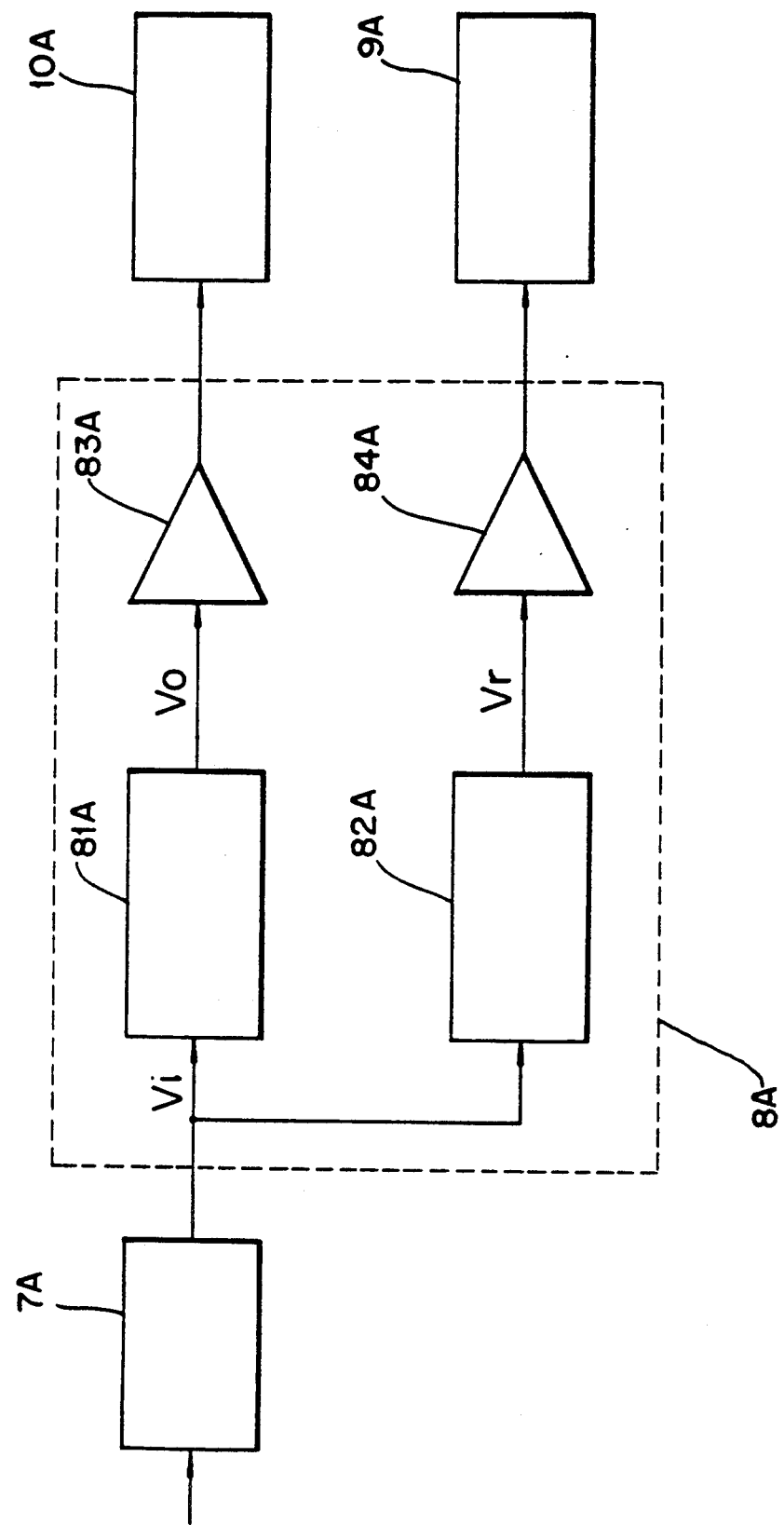
FIG. 2 is a block diagram showing the damping system according to the present invention.

In the washing machine described above, gap sensors 7A, 7B are mounted at four points at an angle of 90 degrees on the cylinder surface of the tub 2, and first control force portions 9A, 9B are installed in the proximity of the gap sensors 7A, 7B. Second control force portions 10A, 10B, are mounted on the surfaces of the cabinet opposite to the first control force portions. A control portion 8 is mounted in the top of the cabinet 3 and comprised of four parts which correspond to the gap sensors, first control force portions and second control force portions. For example, the part 8A corresponds to gap sensor 7A, the first control force portion 10A and the second control force portion 10A. Referring to FIG. 2, the part 8A includes an active damping portion 81A, a control signal portion 82A, a first amplifier 83A and a second amplifier 84A.

In reference to FIG. 2 and FIG. 6, the operation of the control portion 8A is described as follows:

FIG. 2 is the preferred embodiment of the damping system according to the present invention. A gap sensor 7A generates the predetermined signal according to a gap between the tub 2 and the cabinet 3 thereby sensing the gap. The output signal Vi (shown in FIG. 6(a) as an example) from the gap sensor 7A is sent to the active damping portion 81A. The signal Vi is transformed to signal Vo (shown in FIG. 6(b) as an example) which is equal to the signal Vi in amplitude and which lags the signal Vi by 180 degrees. The output signal Vo of the active damping portion 81A is amplified in a first amplifier 83A, and it is applied to a first control force portion 9A (for example, an electromagnet). Also, the output signal Vi of the gap sensor 7A is sent to a control signal portion (for example, full a wave rectifier) 82A and transformed to signal Vr shown in FIG. 6(c). The signal Vr is amplified in a second amplifier 84A, and it is applied to a second control force portion 10A (for example, an electromagnet).

Figure 3:
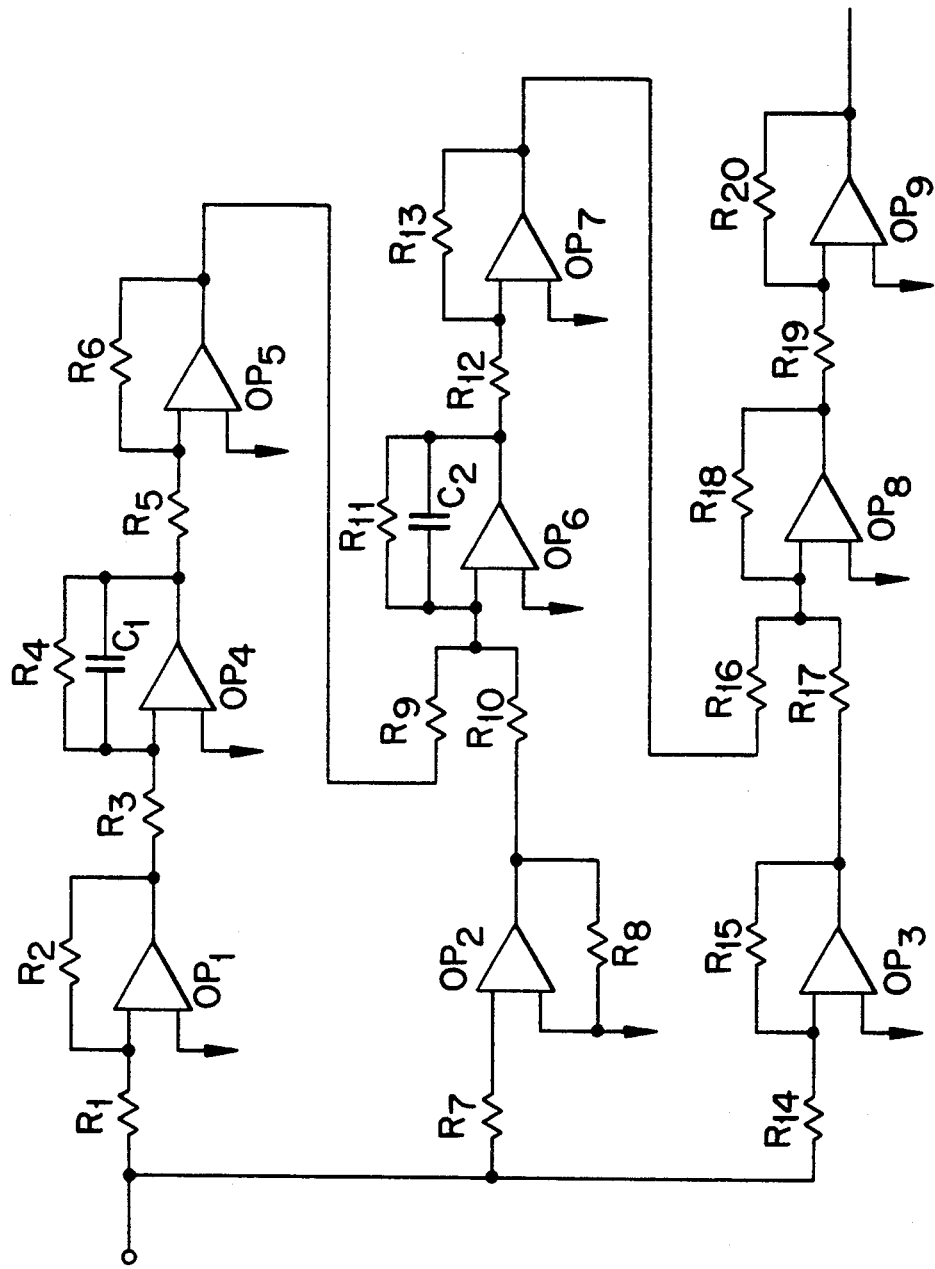
FIG. 3 is a circuit diagram showing the active damping portion.

FIG. 3 is a detailed circuit diagram of the active damping portion 81A, and FIG. 4 and FIG. 5 are waveform drawings showing the results of damping force tests and damping experiments for the active damping portion 81A. The active damping portion 81A comprises operational amplifiers OP1-OP9, resistors R1-R20 and capacitors C1 and C2. The active damping portion 81A transforms the input signal to an output signal of a magnitude which is equal to the input signal and which lags the input signal by 180 degrees. Accordingly, if a signal having a waveform shown in FIGS. 4(a) and (b) is inputted to the active damping portion 81A, the input signal is transformed to the output signal of a magnitude is decreased, so that it becomes such signals as shown in FIGS. 4(c) and (d). When a stationary wave having a constant amplitude as shown in FIG. 5(a) is inputted to the active damping portion 81A, it is transformed to the signal lagging it by 180 degrees as shown in FIG. 5(b). Also, when a nonlinear and random wave as shown in FIG. 5(c) is inputted to the active damping portion 81A, the active damping portion 81A outputs the signal which is nonlinear and random but lags the original signal by 180 degrees as shown in FIG. 5(d).

In reference to FIG. 2 showing the preferred embodiment of the active damping system and FIG. 6 showing a waveform of the signal generated at an important part of the active damping system, the operation of the active damping system applied to a washing machine is described as follows:

When the laundry is put in the suit basket 1 of a washing machine and the washing operation and dehydrating operation are performed, the suit basket 1 rotates by the generated rotating force. The suit basket 1 generates vibrations due to the rotation force, and the vibrations cause it to collide with the tub 2. The collision vibrates the tub 2. That is to say, the suit basket 1 produces nonlinear and random vibrations due to the unbalance of weight of the laundry and transfers the vibrations to the tub 2, so that the tub 2 vibrates.

A gap sensor 7A senses the nonlinear and random vibrations produced at the tub 2 and sends the signal Vi according to the vibrations to the control portion 8A. The active damping portion 81A of the control portion 8A produces the output signal equal in amplitude and lagging the vibrating signal by 180 degrees compared with the vibrating signals which are nonlinear and random. The output signal is applied to the first control force portion 9A mounted on the cylinder surface of the tub 2. On the other hand, the control signal portion 82A produces a control signal and applies it to the second control force portion 10A.

Figure 6A:
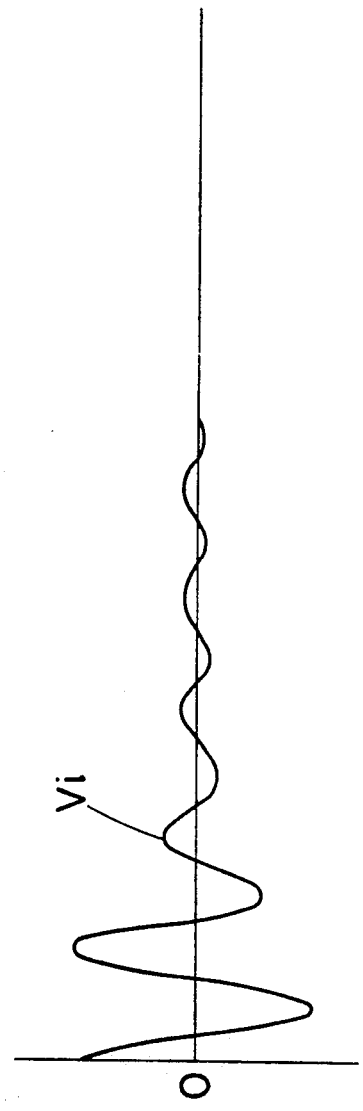
FIGS. 6(a-c) is a waveform diagram showing the signal generated at the important part of the damping system according to the present invention.
Figure 6B:
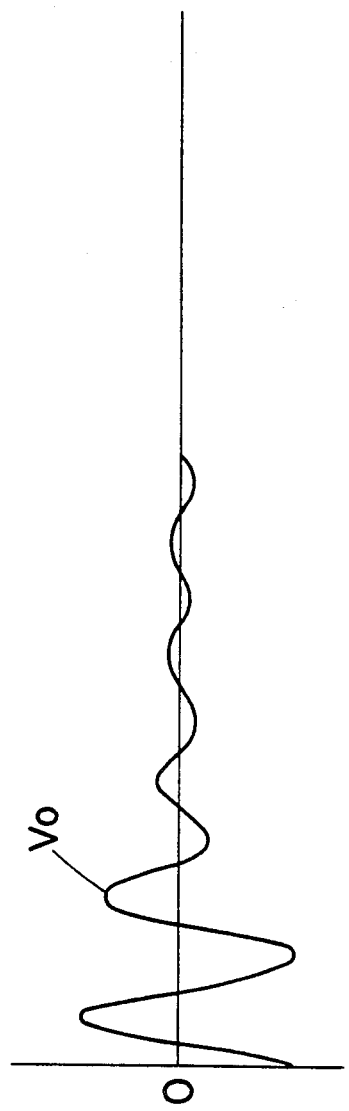
Figure 6C:
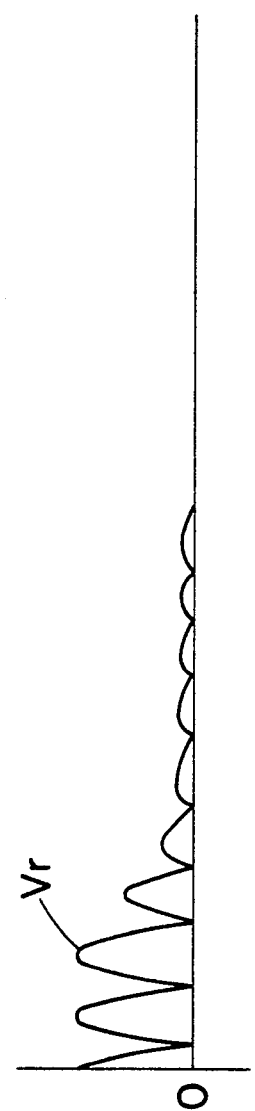

The control operation of the active damping system is described as follows:

The gap sensor 7A is one of four gap sensors mounted on the cylinder surface of the tub 2. When the gap between the tub 2 and the cabinet is greater than the reference distance due to vibrations of the suit basket 1, the gap sensor 7A produces a plus signal having a voltage (for example, +2.5 V) proportional to the vibrations. The voltage of the signal varies with the gap between the gap sensor 7A and the cabinet 3. Also, when the gap between the tub 2 and the cabinet is smaller than the reference distance due to vibrations of the suit basket 1, the gap sensor 7A produces a minus signal having a voltage (for example, −3 V) proportional to the vibrations. This signal varies also with the gap between the gap sensor 7A and the cabinet 3. The signal Vi produced at the gap sensor is shown in FIG. 6(a) and it is inputted to the control portion 8A. In FIG. 2, the embodiment of the control portion 8A is shown. The output signal Vi from the gap sensor 7A is inputted to the active damping portion 81A. As shown in FIG. 6, the signal Vi is transformed to a signal Vo which is equal to the signal Vi in amplitude and which lags the signal Vi by 180 degrees.

The inverting signal Vo is amplified by the first amplifier 83A. The amplified signal is applied to the first control force portion 9A mounted on the surface of the cabinet 3. Also, the output signal Vi from the gap sensor 7A is inputted to the control signal portion 82A (for example, assumed to be a full wave rectifier in the embodiment), and it is transformed to the rectified signal Vr (shown in FIG. 6(d)) by the control signal portion 82A (for example, a full wave rectifier). The rectified signal Vr is applied to the second control force portion 10A. Here, the control signal portion 82A is assumed to be a full wave rectifier, but it is possible to replace it with other circuits.

Accordingly, when the output of the gap sensor 7A is the plus signal, that is to say, when the gap between the tub 2 and cabinet 3 is greater than the reference distance, the output signal Vo of the active damping portion 81A is the minus signal, and after it is amplified by the first amplifier 83A, it is applied to the first control force portion 10A. Also, the output signal from the gap sensor 7A passes through the control signal portion 82A and is applied to the second control force portion 10A. The first control force portion 9A and the second control force portion 10A have opposite polarity to each other, so that they generate an attractive electromagnetic force. Thus, the gap between tub 2 and cabinet 3 is decreased.

On the other hand, when the output of the gap sensor 7A is the minus signal, that is to say, when the gap between the tub 2 and the cabinet 3 is smaller than the reference distance, the output signal Vo of the active damping portion 81A is the plus signal, and after it is amplified by the first amplifier 83A, it is applied to the first control force portion 9A. Also, the output signal from the gap sensor 7A becomes the plus signal through the control signal portion 82A, and it is applied to the second control force portion 10A. The first control force portion 9A and the second control force portion 10A have equal polarity to each other, so that they generate a repulsive electromagnetic force. The gap between tub 2 and cabinet 3 is then decreased.

As described above, the active damping system generates an attractive force and a repulsive force between a tub and a cabinet, so that the slanted tub shifts to its original position. Thus, the washing machine performs the washing operation and dehydrating operation without generating vibrations.

Therefore, when the tub and the cabinet become closer to each other than the reference distance, the apparatus according to the present invention generates to each other repulsive forces between the tub and the cabinet. On the other hand, when the tub and the cabinet become more distant than the reference distance, it generates attractive forces between the tub and the cabinet, whereby it decreases vibrations generated at the tub.

What is claimed is:

1. A damping system for a washing machine comprising:
    gap sensing means being mounted on a cylinder surface of a tub for generating predetermined signals according to a variation of a gap between the tub and a cabinet;
    an active damping portion for receiving output signals from the gap sensing means and for generating control signals which are equal to the output signals in amplitude and lag them by 180 degrees;
    a first amplifier for amplifying the control signals from the active damping portion to a signal size capable of damping the vibrations;
    a first control force portion for receiving amplified signals from the first amplifier and generating an electromagnetic force;
    a control signal portion for receiving the predetermined signals from the gap sensing means, for generating a signal having a sign opposite to the control signals from the active damping portion when the tub and the cabinet become more distant from each other than a reference distance, and for generating a signal having a sign the same as the control signal from the active damping portion, when the tub and the cabinet become closer than the reference distance;
    a second amplifier for amplifying the output signals from the control signal portion to a signal size capable of dampening the vibrations; and
    a second control force portion for receiving the output signals from the second amplifier and generating an electromagnetic force.

2. A damping system for a washing machine as claimed in claim 1, wherein;
    the gap sensing means includes gap sensors which are mounted at a plurality of points forming 90 degree angles on the cylinder surface of the tub, and the first control force portion including portions which are installed in the proximity of the gap sensors, the second control force portions including portions which are mounted on surfaces of cabinet opposite to the first contarol force portions.

3. A damping syatem for a washing machine as claimed in claim 1, wherein;
    the first amplifier and the second amplifier are adjusted in order to output signals equal in amplitude.

4. A damping system for a washing machine as claimed in claim 1, wherein;
    at least one of the first control force portions and the second control force portions is a permanent magnet.

5. A damping system for a washing machine as claimed in claim 2, wherein the active damping portion, the control signal portion, the first amplifier and the second amplifier are mounted on top of the cabinet.

* * * * *